US008911295B2

(12) United States Patent
Mahajan et al.

(10) Patent No.: US 8,911,295 B2
(45) Date of Patent: Dec. 16, 2014

(54) METHOD AND SYSTEM FOR ONLINE MOBILE GAMING

(75) Inventors: Sunil Mahajan, Gurgaon (IN); Rajasekaran Soruban, Bangalore (IN)

(73) Assignee: Comviva Technologies Limited, New Delhi (IN)

( * ) Notice: Subject to any disclaimer, the term of this patent is extended or adjusted under 35 U.S.C. 154(b) by 28 days.

(21) Appl. No.: 13/578,614

(22) PCT Filed: Feb. 12, 2011

(86) PCT No.: PCT/IB2011/000267
§ 371 (c)(1),
(2), (4) Date: Sep. 12, 2012

(87) PCT Pub. No.: WO2011/098905
PCT Pub. Date: Aug. 18, 2011

(65) Prior Publication Data
US 2012/0329559 A1    Dec. 27, 2012

(30) Foreign Application Priority Data

Feb. 12, 2010   (IN) .............................. 311/DEL/2010

(51) Int. Cl.
*G06F 17/00*    (2006.01)
*G06F 9/46*    (2006.01)
*G06F 9/455*    (2006.01)

(52) U.S. Cl.
CPC ............ *G06F 9/465* (2013.01); *G06F 9/45537* (2013.01)
USPC ........................................................... 463/42

(58) Field of Classification Search
USPC ....................................................... 463/16–25
See application file for complete search history.

(56) References Cited

U.S. PATENT DOCUMENTS

| 7,266,818 | B2 * | 9/2007 | Pike et al. ...................... 717/176 |
| 8,392,497 | B2 * | 3/2013 | Vilke et al. ..................... 709/202 |
| 2006/0148567 | A1 | 7/2006 | Kellerman | |
| 2009/0118019 | A1 | 5/2009 | Perlman | |
| 2010/0306773 | A1 * | 12/2010 | Lee et al. .......................... 718/1 |
| 2011/0145275 | A1 * | 6/2011 | Stewart ........................ 707/769 |
| 2012/0178514 | A1 * | 7/2012 | Schulzke et al. ............... 463/17 |
| 2012/0178515 | A1 * | 7/2012 | Adams et al. .................. 463/17 |

FOREIGN PATENT DOCUMENTS

| WO | 2008/049870 A2 | 5/2008 |
| WO | 2009/073832 A1 | 6/2009 |

* cited by examiner

*Primary Examiner* — Ronald Laneau
(74) *Attorney, Agent, or Firm* — Maschoff Brennan

(57) ABSTRACT

Method of executing online gaming application software is disclosed. In an embodiment, the method includes determining a client device platform associated with a client computing device. The method further includes executing, at a server computing device, an online gaming application software hosted in the server computing device, based at least in part on the determined client device platform. The execution is performed in such a manner that the results of the execution can be communicated to a user at the client computing device. The client computing device may be, for example, a mobile phone, a smart phone, a laptop, a palmtop, a personal digital assistant (PDA), or other similar mobile devices with limited processing and memory capabilities and resources.

22 Claims, 4 Drawing Sheets

METHOD AND SYSTEM FOR ONLINE MOBILE GAMING

FIELD OF THE INVENTION

The disclosed invention, in general, relates to mobile gaming applications. In particular, the present invention relates to online mobile gaming applications hosted in server computing device and being accessed by a client computing device.

BACKGROUND OF THE INVENTION

Communication devices like mobile phones, smart telephones, personal digital assistants (PDAs), laptop, personal computers, and other electronic communication devices are widely used for personal, professional, and business purposes. These electronic communication devices have gone beyond luxury to being necessity with the current globalization and due to need for better and remote availability of sharable information and resources. Further, these communication devices have undergone significant technical advancements with regard to processor, memory, and application software which have resulted in increased number of facilities provided by such communication devices.

A typical mobile device not only does provide communication capabilities but also opens up a world of numerous entertainment options for users. For example, mobile applications are available that enable a user to listen to music content, watch videos, play games etc. With the ever increasing usage of mobile devices, the demand for such mobile applications has increased many folds in the last two decades. Understandably, a market segment has emerged that provides products and services to the mobile device users. Mobile users are provided with a wide variety of software, mobile applications, service choices to enhance the features and usage capabilities of the mobile device.

Mobile gaming applications are one of the most popular contents consumed by mobile users in today's mobile networks. In majority of the existing mobile networks, the most popular model available to consume gaming content corresponds to a client-server environment where the mobile device owned by the user serves as a client and service provider's/operator's portal acts as a server. A user can download one or more game application from the portal, pay a price and then owns the content thereafter. The mobile user can use the content repeatedly without paying any additional price.

Another method for consuming gaming content includes making the game available in the mobile device itself. Such games can be provided along with other mobile applications by mobile device manufacturers. These games are typically free and are not separately charged by the device manufacturer. Rather, in most cases, the license fee for the software/mobile application is included in the price of the mobile device. However, such a method suffers from the static nature of most gaming applications that cannot be refreshed when new games are available in the market. In some cases, the refresh is possible but on an additional cost.

Yet another method is to download free games from internet onto the mobile device without paying for the gaming content. Many of these games include advertisements (Ads) within the game content and show up when games are played on the mobile device. Some of these Ads are static whereas some games require a connection to network server for refreshing the Ads on the fly. However, in many parts of the world, mobile users may not have easy and cheap access to internet or may not know how to download the online gaming applications from the internet. Such users therefore depend on operator's portal for mobile gaming content. In addition, quality of the content available at free sites may not be as good as the one available at operator's portal.

Considering the experience from the mobile user's perspective with regard to gaming application, it is understood that one or more requirements need to be fulfilled by the mobile device for being able to successfully consume the mobile content. For instance, the mobile users can belong to different user segments like, but not limited to, "hard core gamers", casual users with good interest in gaming, casual users with occasional or rare interest. The "hard core gamers" refer to mobile users who are interested in advanced or complex games and would like to master such games. Some mobile users would like to play the same game repeatedly till a desired level of performance is achieved. Such users would like to buy games and play them for extended period.

The second segment corresponds to those who would be interested in gaming content but would like to play a different game every time they chose to play and not the same game repeatedly. This segment would be interested in playing a large set of games. The third segment corresponds to mobile users who would be interested in playing games occasionally or rarely. Such users may play the same game few times or a different game every time. Concomitant with the classification of different users, a need arises for a system or method for adaptive pricing that suits all kind of users in different segments.

Furthermore, existing solutions require the user to download the complete game for few minutes of gaming experience. Typical gaming application may have data size of 400 KB-600 KB and takes time considering the existing available data rates. Therefore, to enjoy gaming for few minutes, the mobile user has to wait for long before the content appears on the mobile device. In general, download of a gaming content is not always a great experience for the mobile user. In addition, the mobile user may not want to go to the operator portal and start downloading again in the event of breaks in download operation due to some reason. Furthermore, the mobile game may require a minimum processing power and memory that may not be available in low end mobile devices. Hence, the target users for such games is limited.

In addition, existing systems and technologies pose a challenge to game developers to support large set of handsets which typically results in huge cost of porting games on large set of mobile devices. If the gaming application is not protected, the mobile user can copy games across devices and enjoy it free without paying. Existing systems and methods that enable the different service providers to support multiple pricing options include allowing the mobile device user to download content which is wrapped with a security wrapper (DRM protected). The wrapper controls the price by enabling a connection with server to update the data every time the mobile user selects a given pricing option. Correspondingly, a gaming application developer or an operator has to protect content with Digital Rights Management (DRM) wrappers which is typically an expensive technology.

In view of the above, there exists a well felt need for a system and method that address at least the above stated shortcomings in the art. It is also desirable that the above stated shortcomings be solved in such a manner that allows online hosting of existing mobile gaming application software without any modification in the mobile platform or in the gaming applications respectively.

SUMMARY OF THE INVENTION

It is an object of the present invention to obviate at least the above mentioned shortcomings in the existing systems and methods for online mobile gaming.

It is a further object of the present invention to provide for a method of executing online gaming application software with reduced usage of processing and memory resources of client computing device.

It is yet another object of the present invention to propose systems and methods for accessing and executing online gaming application software at a server computing device and rendering the graphics associated with the execution at a client computing device.

It is still further object of the present invention to propose an online gaming system, which allows existing gaming content/applications to be used as such without any modification to the content/application or the mobile device.

A method of executing online gaming application software is disclosed. In an embodiment, the method includes determining a client device platform associated with a client computing device. The method further includes executing, at a server computing device, online gaming application software hosted in the server computing device based at least in part on the determined client device platform. The execution is performed in such a manner that the results of the execution can be communicated to a user at the client computing device. The client computing device may be, for example, a mobile phone, a smart phone, a laptop, a palmtop, a personal digital assistant (PDA), or other similar mobile devices with limited processing and memory capabilities and resources.

These and other advantages and features of the present invention will become more fully apparent from the following description and appended claims, or may be learned by the practice of the invention as set forth hereinafter. To the accomplishment of the above and related objects, this invention may be embodied in the form illustrated in the accompanying drawings, attention being called to the fact, however, that the drawings are illustrative only, and that changes may be made in the specific embodiments illustrated.

BRIEF DESCRIPTION OF THE DRAWINGS

To further clarify the above and other advantages and features of the present invention, a more particular description of the invention will be rendered with reference to specific embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings in which.

DETAILED DESCRIPTION

Online gaming is very popular with gamers all across the world and mobile device users in particular. The processing and memory capabilities of today's mobile device have improved many folds in the last two decades in comparison to the conventional mobile devices. Notwithstanding such technical advancements, the resources associated with the mobile device are always a premium and any improvement or advancement therein is considered significant in the mobile device industry and the associated services market. As discussed earlier, in order to eliminate lot of issues and pain points in existing gaming solutions or deployment or in general to enhance business in mobile gaming space, the disclosed invention proposes to use online mobile gaming system. An important aspect of online gaming solution is to allow existing mobile games to become available as it is without any modifications to the gaming content or the mobile device.

Figure 1:
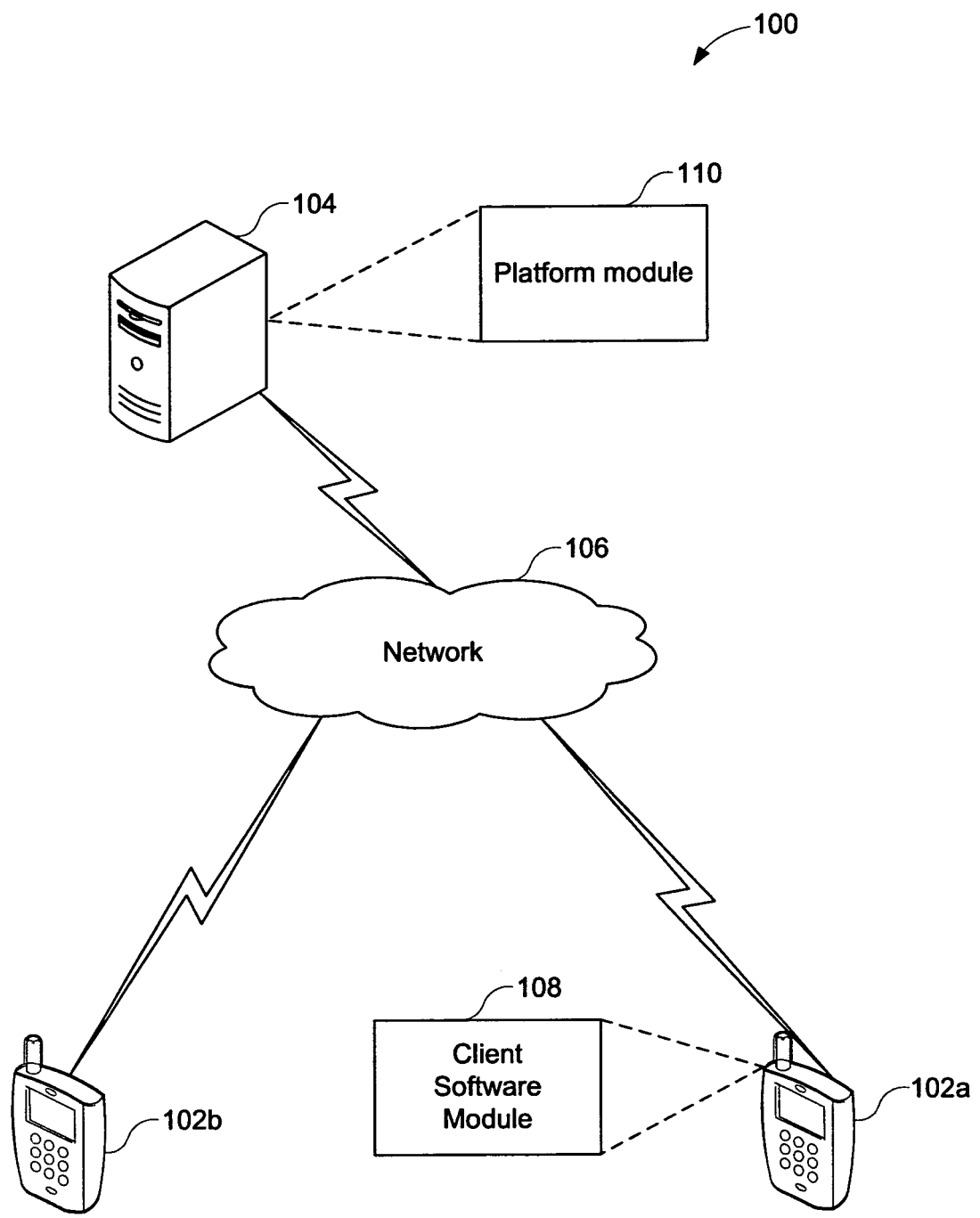
FIG. 1 illustrates an online mobile gaming system according to an embodiment of the present invention.

To this end, FIG. 1 illustrates an online mobile gaming system 100 according to an embodiment of the present invention. Accordingly, the online mobile gaming system 100 is implemented in a typical client-server environment that includes two broad components: a client computing device 102 and a server computing device 104. Throughout the text, the term "client computing device" can interchangeably refer to a mobile phone, a cellular phone, a smart phone, a cell phone, a wireless phone or other similar devices offering capabilities of calling, text messaging, etc. using wireless medium via. a communication network 106. In addition, for purposes of the ongoing description, the client computing device 102 corresponds to a communication device with inbuilt capabilities for sending and receiving signals in addition to the device's talk/text frequency band.

Likewise, the server computing device 104 can interchangeably refer to a typical organization of backend server layer, which operates on client-server relationship in a secure environment. In various implementations, the server computing device 104 may include a main server and a fail-over server that hosts one or more application software (e.g. mobile gaming software) that the client computing device 102 would like to access or use. The server computing device 104 hosts one or more application software that may have been uploaded by the network operator or network service provider. Throughout the following description, references would be made to "application software" interchangeably with "mobile gaming software" or "mobile gaming content". It may be appreciated by those skilled in the art that any application software can be considered for the purposes of the ongoing description without departing from the scope of the disclosed invention. Although, "mobile gaming software" has been considered as an exemplary case of application software in the context of mobile devices, other examples of application software are applicable.

In addition, it may be appreciated that an application software (e.g. mobile gaming) is built on a platform that provides the fundamental tools and resources for coding and execution of the application software. Further, execution of the application software occurs in an environment provided by an operating system of a device. Therefore, to execute application software remotely, the remote host (e.g. server computing device 104) of the application software must run the platform engine corresponding to the application software.

The network 106 may include one or more of wireless network, wired network, Wide Area Network (WAN), Metropolitan Area Network (MAN), Local Area Network (LAN), and Personal Area Network (PAN). In an exemplary implementation, the network 106 corresponds to a mobile/cellular network. Such mobile networks may be, for example, networks employed for Global System for Mobile (GSM) communications or a Code Division Multiple Access (CDMA) based communications. According to an embodiment other mobile device networks, such as, personal communications service (PCS) may also be employed without departing from the scope of the ongoing disclosure. For example, networks confirming to Wi-Fi and Wi-Max standards may also be implemented in the network 106. The network 106 may also be a communication data network, which in case of mobile network can be GPRS network (2.5G, 2.75G-EDGE, 3G or any future networks).

The system 100 further includes a client software module 108 that runs on the client computing device 102 and enables the client computing device 102 to access and execute application software hosted in the server computing device 102. The server computing device 104 includes a platform module 110 configured to determine a client operating system supported by the client computing device 102.

In an implementation, an operator or a service provider uploads mobile game application software on the server computing device 104. The client computing device 102 (e.g. a mobile device) connects to the server computing device 102 and selects a game to be played. In a successive progression, the platform module 110 determines a client device platform associated with the client computing device 102. A device platform may correspond to a suitable combination of hardware and software required for the execution of application software. In the ongoing context, the client device platform corresponds to a client operating system and client device hardware specifications. In addition, there may be cases in which the server computing device 104 and the client computing device 102 run different operating systems. In such a case, the server computing device 104 converts server OS commands to client OS commands thereby eliminating compatibility issues.

In response to the selection, the server computing device 104 executes the mobile game application software at the server computing device 104 based on the determined client device platform. The results of the execution of the application software can be communicated to a user at the client computing device 102 via. the communication network 106. For example, in case of mobile gaming application software, the execution would result in data associated with graphics and audio features of the game. To render a visual(s) or graphics on a display screen of the client computing device 102, the server computing device 104 sends a command to the client computing device 102. The command is received by the client software module 108 which then enables or renders the visual(s) and for graphics on the client computing device 102. The client software module 108 is further configured to capture a response from a user of the client computing device 102 (as the game progresses) and send it back to the server computing device 104 for execution.

Figure 2:
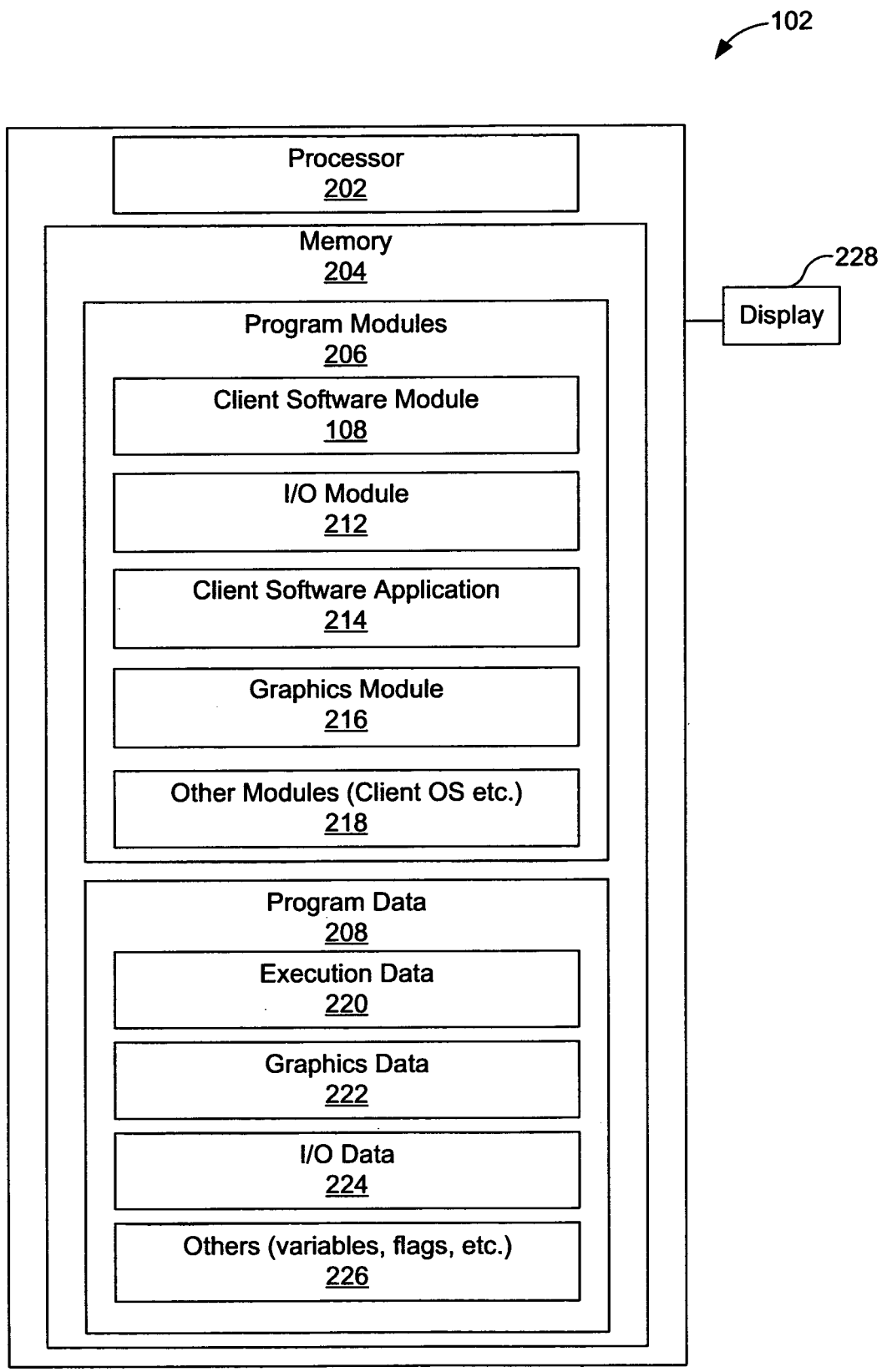
FIG. 2 illustrates a block diagram of client computing device according to an embodiment of the present invention.

FIG. 2 illustrates a block diagram of client computing device 102 (e.g. mobile device) according to an embodiment of the present invention. The client computing device 102 can correspond to any communication device, cellular phone, smart phone, personal digital assistant (PDA), mobile paging device, mobile gaming device, netbook, netpad, laptop, or computer that offers one or more capabilities to make/receive calls, send/receive text messages or electronic mails, play video games, etc. In a very basic configuration, mobile device 102 typically includes at least a processor 202 and a system memory 204. Depending on the exact configuration and type of client computing device 102, system memory 204 may be volatile (such as RAM), non-volatile (such as ROM, flash memory, etc.), or some combination of the two. System memory 204 typically includes a client operating system or system image; one or more program modules 206, and includes program data 208. The processor 202 accesses the memory 204 to execute instructions or applications stored as program modules 206 to perform one or more predetermined functions. The memory 204 stores associated data in program data 208.

The program module(s) 206 includes the client software module 108, input/output (I/O) module 212, client application software 214, graphics module 216, and other modules 218. The program data 208 includes execution data 220, graphics data 222, I/O data 224, and other data (flag values, variables) 226. It may be appreciated that the client computing device (mobile device) 102 may have various features available in all modern day mobile phones or smart phones. Only selected few of the features, functionalities, and modules have been disclosed that find relevance with respect to the ongoing description. For example, mobile device 102 may also have input device(s) such as keypad, stylus, or a pen, voice input device, touch input device, etc. Output device(s) such as a display 228, speakers, etc. may also be included. The display 228 may be a liquid crystal display, or any other type of display commonly used in mobile devices. The display 228 may be touch-sensitive, and would then act as an input device. Such devices are well known in the art and need not be discussed at length here.

In addition, the mobile device 102 may have a communication module (not shown) that allows the mobile device 102 to communicate with other devices (server computing device 104) over a network (e.g. network 106). The communication module in essence is an example of a communication media. Communication media may typically be embodied by computer readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth, Zigbee, Wi-Fi, Skype, Satellite and other wireless media. The term computer readable media as used herein includes both storage media and communication media.

The communication module performs the function of transmitting and receiving radio frequency communications. The communication module facilitates wireless connectivity between the mobile device 102 and the outside world, via. a communications carrier or service provider. Transmissions to and from the communications module can be conducted under control of the client operating system (OS) in other module 216. In other words, communications received by the communication module may be disseminated to client application software via. the operating system, and vice versa.

One or more client application software 214 may be loaded into memory 204 and run on the client operating system (OS) stored in other modules 216. Examples of client application software include phone dialer programs, email programs, scheduling programs, PIM (personal information management) programs, word processing programs, spreadsheet programs, Internet browser programs, and so forth. The mobile device 102 also includes non-volatile storage (not shown) within the memory 204. The non-volatile storage may be used to store persistent information which should not be lost if the mobile device 102 is powered down/off. The applications may use and store information in the storage, such as e-mail or other messages used by an e-mail application, contact information used by a PIM, appointment information used by a scheduling program, documents used by a word processing program, and the like. The mobile device 102 includes a power supply (not shown), which may be implemented as one or more batteries. The power supply might further include an external power source, such as an AC adapter or a powered docking cradle that supplements or recharges the batteries.

The mobile device 102 may also include external notification mechanisms such as an LED and an audio interface. Such devices may be directly coupled to the power supply so that when activated, they remain on for a duration dictated by the notification mechanism even though the processor 202 and other components might shut down to conserve battery power. The LED may be programmed to remain on indefinitely until the user takes action to indicate the powered-on status of the device. The audio interface can be used to provide audible signals to and receive audible signals from the user. For example, the audio interface may be coupled to a speaker for providing audible output and to a microphone for receiving audible input, such as to facilitate a telephone conversation.

In an embodiment, the client software module 108 is implemented using a base platform available on the mobile device 102. For instance, a majority of mobile devices support Java 2 Micro Edition (J2ME) as a software platform and majority of the gaming content available in the market today correspond to J2ME games. It may therefore be appreciated that for J2ME devices and J2ME games, the client software module is implemented in J2ME. As discussed earlier, the server computing device 104 hosts online games as it is without any modification to the gaming content and the mobile device 102. For instance, in case of J2ME devices and J2ME games, the server computing device 104 runs a J2ME engine to execute Java games in native form.

In an exemplary implementation, the client software module 108 is configured to cause an execution of application software residing in the server computing device 104. The application software can be online mobile gaming application software. The server computing device 104 runs on a server operating system (OS) that provides an environment for the gaming application to execute. The results of the execution of the mobile gaming application software can be presented to a user of the client computing device 102. The client software module 108 saves such execution results in execution data 220 of the memory 204. It may be noted herein that the application software or the mobile gaming application software corresponds to a client device platform (e.g. J2ME) associated with the client computing device 102. The server computing device 104 emulates the client operating system to provide an execution platform environment and to eliminate compatibility issues between the server operating system and the client operating system.

In yet another embodiment, the graphics module 216 in the client computing device 102 is configured to render graphics on the client computing device 102 as and when required. In operation, when the server computing device 104 executes the mobile gaming application software, the results of execution would include graphics/visuals associated with the gaming interface. The client software module 108 receives one or more operating system commands from the server computing device 102 for rendering the graphics. The graphics module 216 renders the graphics and visual associated with the execution of the mobile gaming application software and displays the game interface on the display 228. The client computing device 102 stores any graphics associated data in graphics data 222 of memory 204.

Since gaming is an interactive experience, user response and related processing is very important for a satisfactory gaming. The client computing device 102 receives input from the user by means of input devices such as discussed above. In particular, the input module 212 is configured to receive a user input from the user of the client computing device 102 as the game is played. The client software module 108 sends such user inputs to the server computing device 104 for execution and receive execution results of the user input from the server computing device 104 thereafter. The client computing device 102 stores associated user response data in input data 224.

Therefore, the client computing device 102 utilizes the computing resources of the server computing device 104 for execution of mobile gaming application software. As discussed earlier, the existing games can be straightaway uploaded by the operator or the service provider onto the server computing device 104. It is also obvious that the user of the client computing device 102 need not download the complete mobile gaming software from the server computing device 104. Rather, the mobile gaming software is executed locally at the server computing device 104 and the results of the execution are communicated to the client computing device 102 for rendering graphics.

Figure 3:
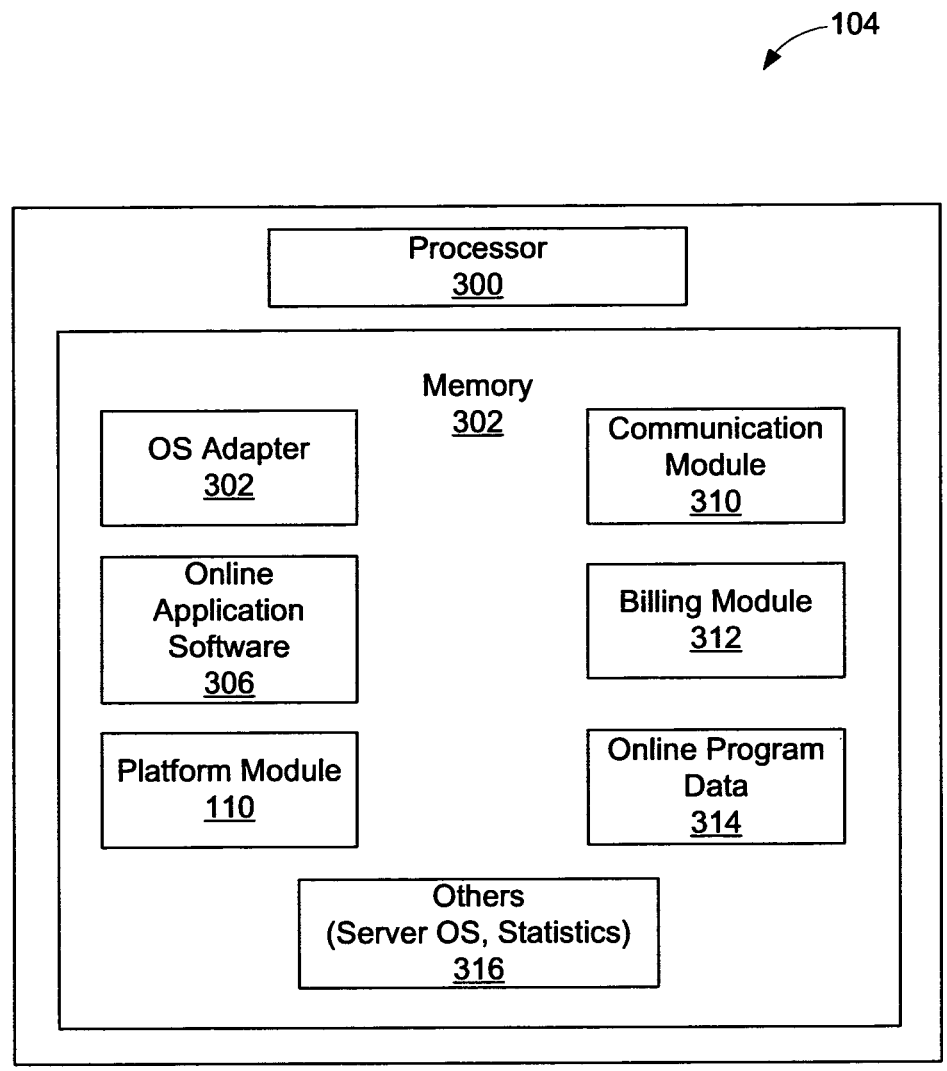
FIG. 3 illustrates a block diagram of server computing device according to an embodiment of the present invention.

FIG. 3 illustrates a block diagram of server computing device according to an embodiment of the present invention. The server computing device 104 may correspond to a portal or a gaming server owned or leased by a network service provider or a network operator for hosting online gaming application software amongst others. As described earlier, the server 104 communicates with the client computing device 102 via. the communication network 106. As shown, the server computing device 104 includes a processor 300 coupled to a memory 302 storing program modules and program data. In particular, the server computing device includes the OS adapter 302, online application software 306, platform module 110, communication module 310, billing module 312, online program data 314, and other modules 316 (e.g. server operating system, user statistics, etc.).

The server computing device 104 hosts a plurality of application software, such as, online mobile gaming software in the online application software 306. A network operator or a service provider can upload such application software onto the server computing device 104 for providing secure access to one or more client computing devices 102a and 102b. The client-server communication is facilitated by the communication network 106. Typically, the client computing device 102 connects with the server computing device 104 via. the communication network 106 and establishes a session.

Existing methods of supporting online mobile gaming has numerous shortcomings. For example, in certain cases, users are allowed to play online mobile games using a browser. Such games are typically built using internet protocols and are typically referred to as WAP games. The WAP games require a independent eco-system to be developed where coders/developers will have to build content specifically for this new environment. Developing such an eco-system will take lot of time to reach a stage when there is enough content to excite end users of the client computing device 102. Such a time frame may not be desirable keeping in view specific segments of end users, such as, hard core gamers.

Hence, one of the important requirements of online gaming system is to allow existing gaming content/application software to be used, as such, without a modification. This helps the developers to be oblivious of the fact that they are building content for download system or online system.

In operation, the server computing device 104 receives an online gaming request from the client computing device 102. The communication module 310 enables the server computing device 104 to communicate with other device (e.g. client computing device 102). Next, the platform module 110 is configured to determine a client device platform supported by the client computing device 102. As described earlier, an application software has an associated platform. The platform module 110 determines the platform specifications supported by the client OS. Based on this determination, the platform module executes, at least in part, one or more of a plurality of application software at the server computing device 104. The execution is carried out in such a manner that results of the execution can be communicated to a user of the client computing device 102. Needless to mention herein, the one or more of the plurality of application software correspond to the client device platform. For example, the application software may correspond to J2ME gaming software and the client computing device 102 may correspond to a J2ME device. In order to make the existing games compatible with the disclosed system, the platform module 110 executes the application software (games) in local platform engine (e.g. J2ME).

The results of the execution may include audio, visual, and other processing data that the server computing device 104 stores in online program data 314. In an implementation, the OS adapter 302 sends one or more operating system commands to client computing device 102 for rendering graphics associated with the execution of the application software. The OS adapter 302 sends all interaction with the end user that includes inputs/outputs (e.g. display and key inputs) to the client computing device 102 over communication network 106. This implies that whenever the mobile gaming application needs to update the display screen or needs inputs from end user or device, the associated information is sent to client computing device 102 over the communication network 106 over a defined protocol. For example, the application and presentation layer protocols of the Open System Interconnect (OSI) protocol layer may be used for sending data associated with the application and the presentation of the execution results.

In certain cases, the bandwidth provided by the communication network 106 may be limited. In an alternative embodiment, different methods may be employed to minimize the communication overheads. For example, some of the commonly needed inputs from the client computing device 102 can be sent once by the client computing device 102 during connection phase so that the server computing device 104 can reuse the data throughout the session.

During a typical game play, the user is required to provide certain inputs. More interactive a game is, the more excited the user is while playing the game. Therefore, the user interface displayed at the plays an important role in making the gaming experience satisfactory or enjoyable. To this end, the OS adapter 302 is configured to receive one or more user inputs communicated by the client computing device 102. It may be noted that the OS adapter 302 converts server OS commands to client OS commands to eliminate compatibility issues between the server operating system and client operating system.

The platform module 110 executes the one or more user inputs received from the client computing device 102, at the server computing device 104. Subsequently, the OS adapter 302 communicates the result of execution of the one or more user inputs to the client computing device 102.

The billing module 312 is configured to implement a billing based on at least one of: user classification, period of use, usage per month user, and other similar time based criteria. Alternatively, the billing can be implemented based on predefine profiles of users of the client computing device, the usage history of the user, and any other event based options.

Other modules 316 may include an advertising module, a software update module, a statistics module, etc. required for management of online gaming system. For example, the advertisements that are part of the gaming interface need to be updated on the fly. There may be updates available for the application software (updated versions of games etc.) that might interest the user. The user or the network operator might want to know the usage history, statistics related to usage, popularity, and other aspects of the online gaming.

Figure 4:
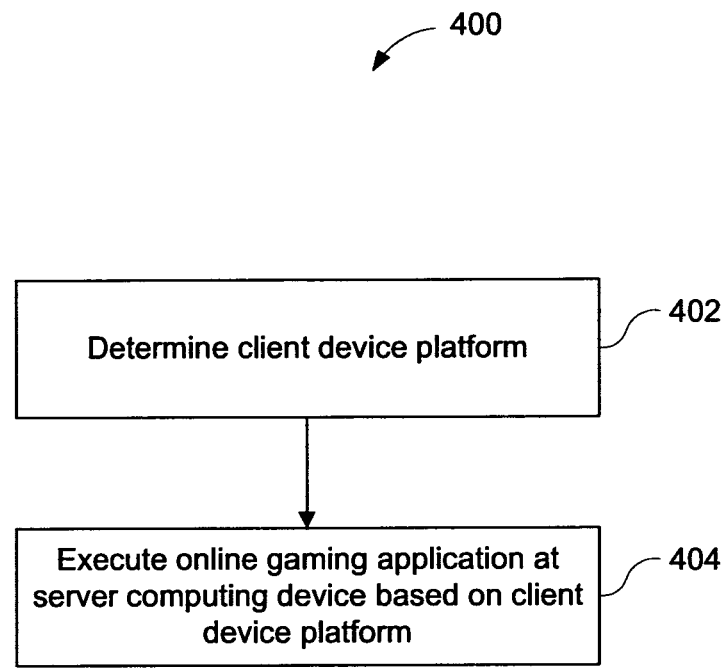
FIG. 4 illustrates a method for executing online gaming application software according to an embodiment of the present invention.

FIG. 4 illustrates method 400 for executing online gaming application software according to an embodiment of the present invention. Steps involved in the method 400 will be described with reference to FIG. 1, FIG. 2, and FIG. 3.

Accordingly, at block 402 client device platform associated with client computing device is determined. In an implementation, the platform module 110 determines the client device platform supported by the client OS. This enables the platform module 110 to select appropriate platform engine that corresponds to the client device platform. For example, for a J2ME supported client computing device 102 and an online game based on J2ME, the platform module 110 selects a J2ME platform engine locally available at the server computing device 104.

In an implementation, the method includes accessing the server computing device to select the online gaming application software from a plurality of online gaming application software hosted at the server computing device 104. In operation, the client computing device 102 gains access to the server computing device 104 and establishes a gaming session. In such a session, the user of the client computing device 102 may be presented with multiple options of online mobile games on a graphical user interface (on the display 228). The user may utilize input means at the client computing device 102 to select a given online gaming application software. The platform module 110 proceeds with the determination of requisite platform engine corresponding to the selected game based on the user selection.

At block 404, the online gaming application software is executed, at the server computing device 104, based at least in part on the determined client device platform such that the results of the execution can be communicated to a user at the client computing device 102. In a successive progression, the platform module 110 executes the online gaming application software using the selected platform engine. For example, the platform module 110 executes J2ME based online gaming application software using a J2ME platform engine.

The results of the execution may include user interface details, audio data, visual data associated with the gaming experience. Such data is communicated from the server computing device 104 to the client computing device 102. In an implementation, the method further includes receiving, at the client computing device 102, one or more commands to render graphics associated with the execution of the online gaming application software. In operation, the OS adapter 302 issues OS commands that can be interpreted by the client operating system. There may be cases where the server operating system is different from the client operating system. In such scenarios, the OS adaptor 302 converts the server OS commands to client OS commands. The graphics module 216 receives such commands and data (graphics data 222) and renders the graphics associated with the online gaming application software.

During the game play, user provides inputs as part of the interactive experience of the gaming content. The client software module 108 sends the user inputs acquired by the input module 212 to the OS adaptor 302. The OS adaptor 302 converts the client OS data (user inputs) to server OS data if required and sends it to platform module for processing/execution. In some embodiments, the user inputs can directly be processed by the platform module 110 without conversion by the OS adaptor 302. The platform module 110 executes the user inputs and sends back the execution results to the client software module 108.

The disclosed systems and methods defines an environment that allows existing gaming content to be used without modification in an online gaming system. This has the advantage of making a large amount of gaming content available for online gaming systems and makes a developer's job easy. With single content build, developers can reach out to both hard core gamers for game download and for casual gamers.

The disclosed online gaming system helps in increasing the reach of each mobile game to end users. Many games are restricted to limited set of client computing devices because of multiple reasons, such as, complexity of game, challenging computation requirements and memory. In addition, some client computing devices may correspond to low end devices that cannot support such gaming application software. Such games are directed to limited set of devices or users due to huge cost of porting for developers. In the disclosed online gaming system, since the mobile gaming application software does not execute on mobile device (client computing device 102), the gaming experience is not dependent, largely, on the memory and computation capability of the mobile device. Hence, fewer ports of games can be made available to large set of devices or end users. Additionally, porting of game is also reduced to limited activities, as developer need not port game separately for low end phones or phones with limited capabilities etc.

The disclosed online gaming also solves the problem of redistribution without much effort. Many a times, the developer faces the problem of redistribution of gaming content when new version of same game is available. In a pure download model, users will have to discover new versions and then again go through the pain of downloading the gaming content. In comparison, the disclosed online gaming system replaces the content on the network server (server computing device 104) without any user involvement and the user will see the new version of the game in subsequent access.

The disclosed online mobile gaming system can readily support mechanism where gamers can collaborate easily, which is not easily possible in existing solutions. The end users see the interaction on client computing device 102 without worrying about whether the game is executed locally on the client computing device 102 or in the network server (server computing device 104).

It may be noted that the communication protocol to efficiently implement the interface transfer commands is critical to implement the disclosed system. The reason for such criticalities include, but not limited to, limited bandwidth availability in wireless networks and latency that may cause bad end user experience. The server computing device 102 can have different platforms (engines) implemented on the same physical server or can be hosted on different physical servers.

Implementing online gaming system eliminates the need for users to download mobile games and provide users with flexible pricing to consume gaming content on need basis. It helps the network operator in creating flexible pricing options as games can be offered on pay-per-play, bundled in a pack for subscription and even on try-n-buy options for hard core gamers. The disclosed billing module 312 does not require any pricing control wrapper or any security wrapper since the content never goes in full form to the end user device (client computing device 102). Moreover, the content cannot be copied.

The disclosed online gaming systems and methods provide very interesting opportunity to operators and game developers alike. Since the games are always played online, the server computing device 104 knows user behavior. Therefore, it becomes very easy for the server computing device 104 to perform fine profiling of end user in terms of what genre of games, what time of the day user plays and even how many times a particular game was played. In addition, the server computing device 104 controls the user interface. User profiling and interface control combined together provides for a great tool to operators and developers in supporting gaming content with much targeted advertising content.

It will be appreciated that the teachings of the present invention can be implemented as a combination of hardware and software. The software is preferably implemented as an application program comprising a set of program instructions tangibly embodied in a computer readable medium. The application program is capable of being read and executed by hardware such as a computer or processor of suitable architecture. Similarly, it will be appreciated by those skilled in the art that any examples, functional block diagrams and the like represent various exemplary functions, which may be substantially embodied in a computer readable medium executable by a computer or processor, whether or not such computer or processor is explicitly shown. The processor can be a Digital Signal Processor (DSP) or any other processor used conventionally capable of executing the application program or data stored on the computer-readable medium.

The example computer-readable medium can be, but is not limited to, (Random Access Memory) RAM, (Read Only Memory) ROM, (Compact Disk) CD or any magnetic or optical storage disk capable of carrying application program executable by a machine of suitable architecture. It is to be appreciated that computer readable media also includes any form of wired transmission. Further, in another implementation, the method in accordance with the present invention can be incorporated on a hardware medium using ASIC or FPGA technologies.

It is also to be appreciated that the subject matter of the claims are not limited to the various examples and or language used to recite the principle of the invention, and variants can be contemplated for implementing the claims without deviating from the scope. Rather, the embodiments of the invention encompass both structural and functional equivalents thereof.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

We claim:

1. A method of executing online gaming application software stored in a non-transitory tangible computer readable medium associated with a server computing device, the method comprising:
   determining a client device platform associated with a client computing device based on a selection of the online gaming application software, wherein the selection is received as user input from the client computing device; and
   executing, at a server computing device, the online gaming application software based at least in part on the determined client device platform such that the execution generates one or more operating system commands matching to the client device platform for communication to the client computing device;
   wherein the one or more operating system command is configured to trigger:
   detection of user input at the client computing device; and
   rendering of data associated with graphics and audio features of the game at the client computing device.

2. The method as claimed in claim 1 further comprising accessing the server computing device to select the online gaming application software from a plurality of online gaming application software.

3. The method as claimed in claim 1 further comprises communicating one or more operating system commands from the server computing device to the client computing device.

4. The method as claimed in claim 1 further comprising receiving, at the client computing device, one or more operating system commands to render graphics associated with the execution of the online gaming application software.

5. The method as claimed in claim 4 further comprising rendering graphics at the client computing device based on the one or more operating system commands.

6. The method as claimed in claim 1 further comprising receiving user inputs at the client computing device and communicating the user inputs to server computing device for execution.

7. The method as claimed in claim 1, wherein the client computing device corresponds to a mobile device.

8. A server computing device hosting a plurality of online gaming application software, the server computing device comprising:
    a platform module configured to determine a client device platform supported by a client computing device based on a selection of the online gaming application software, wherein the selection is received as user input from the client computing device; and
    execute, at least in part, one or more of the plurality of online gaming application software stored on a non-transitory and tangible computer readable medium at the server computing device based at least in part on the determination such that the execution generates one or more operating system commands matching to the client device platform for communication to the client computing device;
    wherein the one or more operating system command is configured to trigger:
        detection of user input at the client computing device; and
        rendering of data associated with graphics and audio features of the game at the client computing device.

9. The server computing device as claimed in claim 8 further comprising a transceiver configured to send one or more OS commands to client computing device for rendering graphics associated with the execution of the one or more of the plurality of online gaming application software.

10. The server computing device as claimed in claim 9, wherein the transceiver is further configured to receive one or more user inputs communicated by the client computing device.

11. The server computing device as claimed in claim 10, wherein the platform module is further configured to execute the one or more user inputs at the server computing device and communicate the result of execution of the one or more user inputs to the client computing device.

12. The server computing device as claimed in claim 8 further comprising a billing module configured to implement a billing based on at least one of: user classification, time period of use or size of content use.

13. The server computing device as claimed in claim 8, wherein the one or more of the plurality of online gaming application software corresponds to mobile gaming application software.

14. The server computing device as claimed in claim 8, wherein the client computing device corresponds to a mobile device.

15. The server computing device as claimed in claim 9, wherein the OS adapter is configured to convert server OS commands to client OS commands.

16. A client computing device comprising a client software module stored on a non-transitory and tangible computer readable medium associated with a client computing device, said client software module configured to:
    (a) trigger execution of an online gaming application software residing in the server computing device in an environment provided by a server operating system (OS) that emulates a client operating system supported by the client computing device upon receiving a selection of the online gaming application software as a user input from said client computing device, and communicate the results of such execution to the client computing device in the form of one or more operating system command matching to the client device platform; and
    (b) in response to receiving the one or more operating system command from the server computing device, performing detection of user input and rendering of data associated with graphics and audio features of the game at the client computing device.

17. The client computing device as claimed in claim 16 further comprising a graphics module configured to render graphics on the client computing device, the graphics being associated with the execution of the online gaming application software at the server computing device.

18. The client computing device as claimed in claim 16, wherein the client software module is further configured to execute one or more operating system commands received from the server computing device.

19. The client computing device as claimed in claim 16 further comprising an input module configured to receive a user input.

20. The client computing device as claimed in claim 19, wherein the client software module is further configured to send the user input to the server computing device for execution and receive execution results of the user input from the server computing device.

21. The client computing device as claimed in claim 16, wherein the one or more of the plurality of online gaming application software corresponds to mobile gaming application software.

22. The client computing device as claimed in claim 16, wherein the client computing device corresponds to a mobile device.

\* \* \* \* \*